(12) United States Patent
Sawada (10) Patent No.: US 9,941,500 B2
(45) Date of Patent: Apr. 10, 2018

(54) CONVEYING APPARATUS AND A CONVEYING METHOD OF SEPARATOR OF ELECTRIC DEVICE

(71) Applicant: Nissan Motor Co., Ltd., Yokohama-Shi, Kanagawa (JP)

(72) Inventor: Yasuhiro Sawada, Isehara (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/298,014

(22) Filed: Oct. 19, 2016

(65) Prior Publication Data
US 2017/0047568 A1    Feb. 16, 2017

Related U.S. Application Data

(62) Division of application No. 14/646,243, filed as application No. PCT/JP2013/081790 on Nov. 26, 2013, now abandoned.

(30) Foreign Application Priority Data

Dec. 5, 2012 (JP) ................................. 2012-266495

(51) Int. Cl.
*B32B 41/00* (2006.01)
*H01M 2/16* (2006.01)
(Continued)

(52) U.S. Cl.
CPC ............. *H01M 2/1673* (2013.01); *B32B 5/00* (2013.01); *B32B 15/20* (2013.01); *B32B 18/00* (2013.01);
(Continued)

(58) Field of Classification Search
CPC .. H01M 2/1673; H01M 4/0471; H01M 4/043; H01M 2/145; H01M 2/1686;
(Continued)

(56) References Cited

U.S. PATENT DOCUMENTS 3,784,414 A    1/1974 Macaulay et al.
8,844,795 B2    9/2014 Yano et al.
(Continued)

FOREIGN PATENT DOCUMENTS

CN    102185125 A    9/2011
JP    2009181832 A    8/2009
(Continued)

*Primary Examiner* — Michael N Orlando
*Assistant Examiner* — Joshel Rivera
(74) *Attorney, Agent, or Firm* — Young Basile Hanlon & MacFarlane, P.C.

(57) ABSTRACT

A conveying apparatus for a separator of an electrical device alternately laminates a first electrode and a second electrode of different polarity from the first electrode, with a separator interposed therebetween to form a laminated body for conveyance. The separator includes a melt material representing a substrate and a heat-resistant material laminated on one surface of the melt material and having a higher melting point than the melt material. The separator conveying apparatus includes a drive member which makes contact with the separator and conveys the separator; and a pressure member which, while urging the drive member via the separator, is driven by the drive member. The drive member makes contact with the melt material portion of the separator. With this separator conveying apparatus, it is possible to maintain constant feed size or dimension of the separator assembly.

9 Claims, 5 Drawing Sheets

(51) Int. Cl.
- *H01M 4/139* (2010.01)
- *H01M 2/14* (2006.01)
- *B32B 5/00* (2006.01)
- *B32B 15/20* (2006.01)
- *B32B 18/00* (2006.01)
- *B32B 37/06* (2006.01)
- *B32B 37/10* (2006.01)
- *B32B 37/24* (2006.01)
- *B65H 16/02* (2006.01)
- *B65H 20/10* (2006.01)
- *B65H 35/06* (2006.01)
- *H01M 4/04* (2006.01)

(52) U.S. Cl.
CPC .............. *B32B 37/06* (2013.01); *B32B 37/10* (2013.01); *B32B 37/24* (2013.01); *B65H 16/021* (2013.01); *B65H 20/10* (2013.01); *B65H 35/06* (2013.01); *H01M 2/145* (2013.01); *H01M 2/1686* (2013.01); *H01M 4/043* (2013.01); *H01M 4/0471* (2013.01); *H01M 4/139* (2013.01); *B32B 2307/202* (2013.01); *B32B 2307/206* (2013.01); *B32B 2311/12* (2013.01); *B32B 2311/24* (2013.01); *B32B 2315/02* (2013.01); *B32B 2457/10* (2013.01); *B65H 2301/5151* (2013.01); *B65H 2404/143* (2013.01); *B65H 2406/32* (2013.01); *B65H 2406/33* (2013.01); *B65H 2801/72* (2013.01); *Y10T 156/10* (2015.01); *Y10T 156/17* (2015.01)

(58) Field of Classification Search
CPC ........... B32B 5/00; B32B 37/10; B32B 37/06; B32B 18/00; B32B 15/20; B65H 20/10; B65H 16/021; B65H 35/06
USPC ........................... 156/64, 350, 351, 378, 379
See application file for complete search history.

(56) References Cited

U.S. PATENT DOCUMENTS

| | | |
|---|---|---|
| 2002/0013986 A1 | 2/2002 | Ahn et al. |
| 2005/0016670 A1 | 1/2005 | Kanbara et al. |
| 2011/0293989 A1* | 12/2011 | Hasegawa .................. C08J 5/18 429/144 |
| 2012/0132697 A1* | 5/2012 | Yano ....................... B29C 65/18 228/212 |
| 2014/0026400 A1 | 1/2014 | Yuhara et al. |

FOREIGN PATENT DOCUMENTS

| | | |
|---|---|---|
| JP | 2012009150 A | 1/2012 |
| JP | 2012226921 A | 11/2012 |
| JP | 2012227125 A | 11/2012 |
| WO | 2012137904 A1 | 10/2012 |

* cited by examiner

CONVEYING APPARATUS AND A CONVEYING METHOD OF SEPARATOR OF ELECTRIC DEVICE

CROSS REFERENCE TO RELATED APPLICATION

The present application is a divisional application of Ser. No. 14/646,243, filed on May 20, 2015, which claims priority to Japanese Patent Application No. 2012-266495, filed Dec. 5, 2012, both incorporated herein in their entirety.

TECHNICAL FIELD

The present invention relates to a transfer or conveying apparatus of a separator of an electric device and to a conveying method thereof.

BACKGROUND

Conventionally, in an electrical device such as a secondary battery, a power generating element for performing charging and discharging operations is sealed in an outer package. The Power generating element is formed by stacking a separator and electrodes. The separator easily shrinks when heated. When the separator shrinks, electrical short circuit occurs locally. This would reduce the output of the electrical device.

Thus, by using, as a counter measure a separator which is formed by laminating on a substrate melt material a heat-resistant material having a melting point higher than the melting point of the melt material, the separator is prevented from shrinkage or contracting even if the separator is heated.

Incidentally, there is a configuration of bonding both surfaces of an elongate separate by sandwiching with an elongate positive electrode plate and an elongate negative electrode while conveying. That is, the positive electrode plate is laminated or stacked on one surface of the separator, while the negative electrode plate is laminated on the other surface of the separator. Since the positive and negative plates are made of different materials, easiness to peeling is different as well (for example, see Japanese Patent Application Publication No. 2009-181832 A).

However, in Japanese Patent Application Publication No. 2009-181832 A, when conveying the elongate member prepared with another member being laminated on the substrate, no considerations in view of differences such as ease of separation due to the difference in materials is made so as to provide a structure to ensure conveyance while maintaining accuracy in conveyance amount or feed amount.

In such a configuration, for example, in the case of the separator formed by laminating a heat-resistant material on a molten material as the substrate or base material, when the heat-resistant material is scraped or peeled off, it is likely that the conveyance amount the separator changes.

SUMMARY

The present invention has been made to solve the problems described above, and is intended to provide a conveying apparatus of a separator of electric device and a conveying method thereof according to which the separator formed by laminating a heat-resistant material on a substrate melt material may be conveyed at a constant feed amount or rate.

A conveying apparatus of a separator for an electrical device to solve the problem above is configured to alternately laminate a first electrode on a second electrode different in polarity from the first electrode with a separator interposed therebetween. A separator is prepared which includes a melt or fused material as substrate or base material and a heat-resistant material of higher melting point than the melt material. Also, a drive member that contacts the separator to convey the separator and a pressurizing member that urges the drive member via the separator to be driven by the drive member are prepared. Here, the drive member is in contact with the melt material of the separator.

Further, a conveying method of a separator of an electrical device that achieves the object above is configured to alternately laminate a first electrode and a second electrode different in polarity from the first electrode and to convey the laminated body. A separator is prepared which includes a melt material as substrate or base material and a heat-resistant material of higher melting point than the melt material. Also, a drive member that contacts the separator to convey the separator and a pressurizing member that urges the drive member via the separator to be driven by the drive member are used to convey the separator. Here, the drive member contacts the melt material of the separator.

DETAILED DESCRIPTION OF THE EMBODIMENTS

Below, with reference to the accompanying drawings, description is given of an embodiment of the present invention. The same reference numerals are given to the same elements, and duplicate description will be omitted in the description of the drawings. The proportion and size of each member in the drawings may be different from the proportion and the size of the actual one, and exaggerated for convenience of explanation.

First, description is given of a structure of an electrical device 1 in which separators 30 conveyed by a separator welding apparatus 100 with a separator conveying apparatus 500, 600 pertaining to the present embodiment are welded or joined, with reference to FIGS. 1 to 4.

Figure 1:
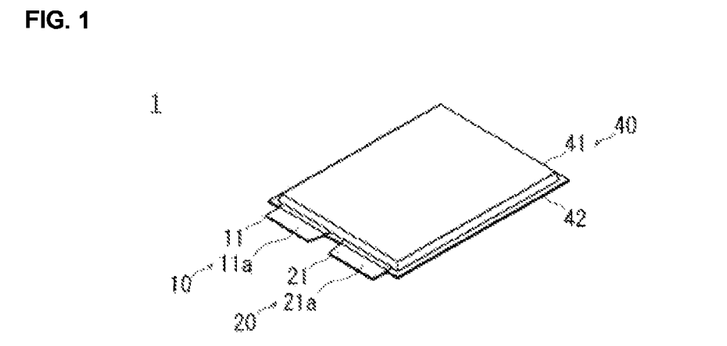
FIG. 1 is a perspective view showing an electrical device in which separators are joined in the separator welding apparatus comprising a separator conveying apparatus pertaining to the present embodiment.
Figure 2:
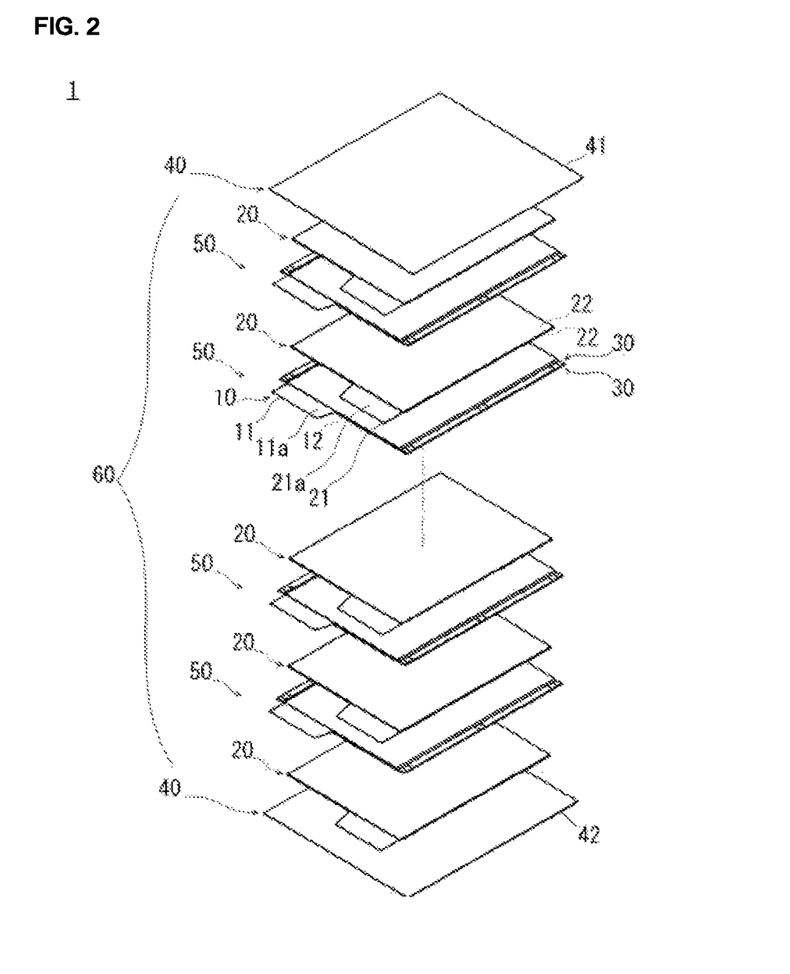
FIG. 2 is an exploded perspective view showing an electrical device in which separators are joined by separator welding apparatus comprising a separator conveying apparatus pertaining to the present embodiment.
Figure 3:
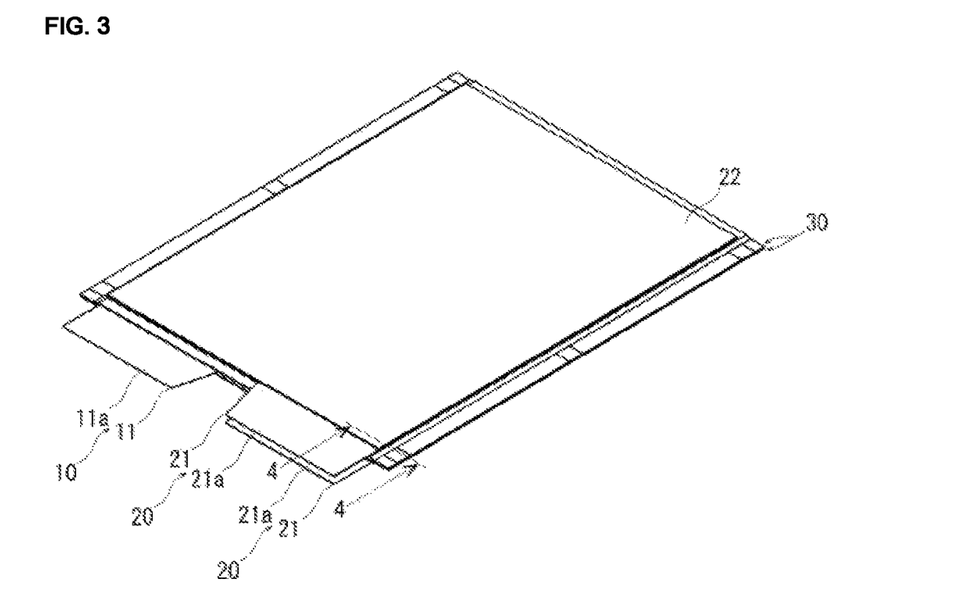
FIG. 3 is a perspective view showing a state in which, by the welding apparatus comprising a separator conveying apparatus pertaining to the present embodiment, a positive electrode is enclosed in a bag or pouch by a pair of separators to form a pouch electrode on both ends thereof being laminated with a negative electrode, respectively.
Figure 4:
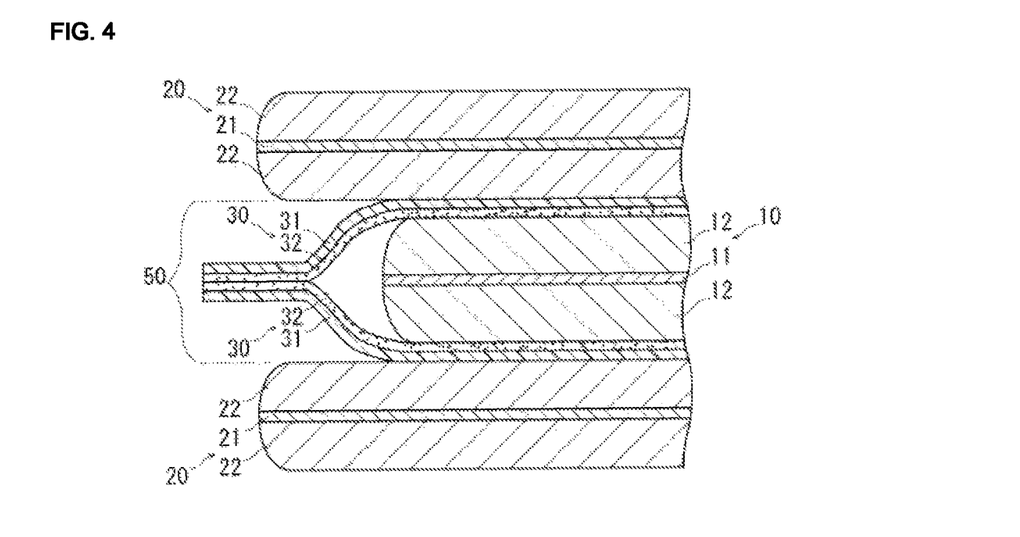
FIG. 4 is a sectional view pertaining to the present embodiment taken along line 4-4 of FIG. 3.

FIG. 1 is a perspective view showing an electrical device 1 in which separators are joined by the separator welding apparatus 100 comprising a separator conveying apparatus 500, 600 pertaining to the present embodiment; FIG. 2 is an exploded perspective view showing an electrical device 1 in which separators are joined by the separator welding apparatus 100 comprising a separator conveying apparatus 500, 600 pertaining to the present embodiment; FIG. 3 is a perspective view showing a state in which, by the welding apparatus 100 comprising a separator conveying apparatus 500, 600 pertaining to the present embodiment, a positive electrode 10 is enclosed in a bag or pouch by a pair of separators 30 to form a pouch electrode 50 on both ends thereof being laminated with a negative electrode 20, respectively; and FIG. 4 is a sectional view taken along line 4-4 shown FIG. 3.

As shown in FIG. 1, for example, the electrical device 1 represents a lithium ion secondary battery, a lithium polymer battery, a nickel hydrogen battery, a nickel cadmium battery. A shown in FIG. 2, in the electrical device 1, the power generating element 60 for charge/discharge is sealed with an outer covering or exterior material 40. The power generating element 60 is configured by alternately laminating a pouched electrode 50 sandwiching a positive electrode 10 by a pair of separators 30 for welding and a negative electrode 20.

The positive electrode 10 represents a first electrode, and is formed by bonding on both surfaces of a conductive, positive electrode collector 11 positive active materials 12, as shown in FIG. 2. A positive electrode terminal 11a for taking out the power is formed by extending a part of one end of the positive electrode collector 11. A plurality of positive electrode terminals 11a of the plurality of laminated positive electrodes 10 are fixed together by welding or adhesive.

The material of the positive electrode current collector 11 of the positive electrode 10, for example, is made of aluminum expanded metal, or aluminum mesh or aluminum punched metal. When the electrical device 1 is a lithium ion secondary battery, the material of the positive electrode active material 12 of the positive electrode 10 is composes of various oxides (lithium manganese oxide, such as LiMn2O4; manganese dioxide; lithium nickel oxides such as LiNiO2; lithium cobalt oxide such as LiCoO2; lithium-containing nickel-cobalt oxide; amorphous pentoxide vanadium containing lithium) or chalcogen compound (titanium disulfide, molybdenum disulfide).

A negative electrode 20 corresponds to a second electrode of different polarity to the first electrode (positive electrode 10), and as shown in FIG. 2, is formed by bonding negative active material 22 on both surfaces of a negative electrode current collector 21 which is conductive. A negative electrode terminal 21a is formed by extending from a part of one end of the negative electrode collector 21 so as not overlap the positive electrode terminal 11a formed in the positive electrode 10. The longitudinal length of the negative electrode 20 is longer than the longitudinal length of the positive electrode 10. In the lateral length of the negative electrode 20 is of the same as that of the positive electrode 10. A plurality of negative electrode terminals 21a of the negative electrodes 20 stacked is secured together by adhesive or welding.

The material of the negative electrode current collector 21 of the negative electrode 20, for example, is made from a copper expanded metal, copper mesh, or copper punched metal. As the material of the negative electrode active material 22 of the negative electrode 20, when the electrical device 1 is a lithium ion secondary battery, and use is made of a carbon material that adsorbs and releases lithium ion. As such carbon material, for example, natural graphite, artificial graphite, carbon black, activated carbon, carbon fiber, coke, or organic precursor (phenolic resin, polyacrylonitrile, or cellulose) is heat-treated in an inert atmosphere and synthetic carbon is used.

As shown in FIG. 2, the separator 30 is provided between the positive and negative electrodes 10, 20 to electrically isolate the positive electrode 10 and the negative electrode 20 from each other. By holding an electrolyte solution between the positive electrode 10 and the negative electrode 20, the separator 30 ensures conductivity of the ion. The separator 30 is formed in a rectangular shape. The longitudinal length of the separator 30 is longer than the longitudinal length of the negative electrode 20 except the portion of the negative electrode terminal 21a.

The separator 30, as shown in FIG. 4, for example, is formed by laminating a heat-resistant material 32 on one surface of the molten material or member 31. The heat-resistant material 32 has a melting temperature higher than the melt material 31. When the heat-resistant material 32 that is laminated on the melt material 31 is cut or scraped, the frictional force is changed due to irregularities which occur on the surface of the heat-resistant material 32. Further, if the heat-resistant material 32 that is laminated to the melt material 31 is peeled off, the surface of the melt material 31 is exposed.

A pair of adjacent separators 30 is bonded with the associated hot-melt material 32 faced to each other. Thus, for example, even when the heat-resistant material 32 is powder which may easily scatter after being applied to the melt material 31 and subsequently dried, the powder may be confined and sealed in the interior of the pair of the adjacent separators 30. That is, even if the electrical device 1 receives shock or vibrations, it is possible to prevent scattering of the heat-resistant material 32 of the separator 30.

As the material of the molten material 31 of the separator 30, for example, use may be made of a polypropylene. The molten material 31 is impregnated with a non-aqueous electrolyte solution prepared by dissolving an electrolyte in a non-aqueous solvent. In order to retain the non-aqueous electrolytic solution, use is made to contain a polymer.

As a material of the heat-resistant material 32 of the separator 30, for example, use is made of ceramic molded with high temperature inorganic compounds. The ceramic is formed to be porous by binding ceramic particles of silica, alumina, zirconium oxide, titanium oxide with a binder. The material of the heat-resistant material 32 is not limited to ceramic. The alternative is acceptable as long as the melting temperature thereof may be higher than the melting member 31. The ceramic particles correspond to the powder, in which the binding effect may be different and the peel strength is thereby affected depending on density and coupling condition of the binder, for example.

As shown in FIG. 2, the outer or exterior package 40 may be consisted, for example, of laminate sheets 41, 42 with a metal plate inside and is sealed by covering both sides of the power generating element 60. When sealing the power generating element 60 with the laminate sheets 41, 42, a portion of the periphery of the laminate sheet 41 and 42 is made open, and the other periphery will be sealed by heat welding or the like. An electrolyte is injected from the portion that is open and the separator 30 or the like is impregnated with a liquid charge. While depressurizing the interior from the open portion of the laminate sheets 41, 42 to remove air, the open portion will also be heat-sealed to seal completely.

As the material for the laminate sheets 41, 42, for example, use is made of three different, laminated materials. Specifically, with respect to the material of the heat-fusible resin of the first layer adjacent to the negative electrode 20, use is made of, for example, polyethylene (PE), ionomer, or ethylene vinyl acetate (EVA). As the metal foil of the second layer, for example, use is made of an Al foil or Ni foil. As the resin film of the third layer, for example, use is made of polyethylene terephthalate (PET) or nylon with rigidity.

Figure 5:
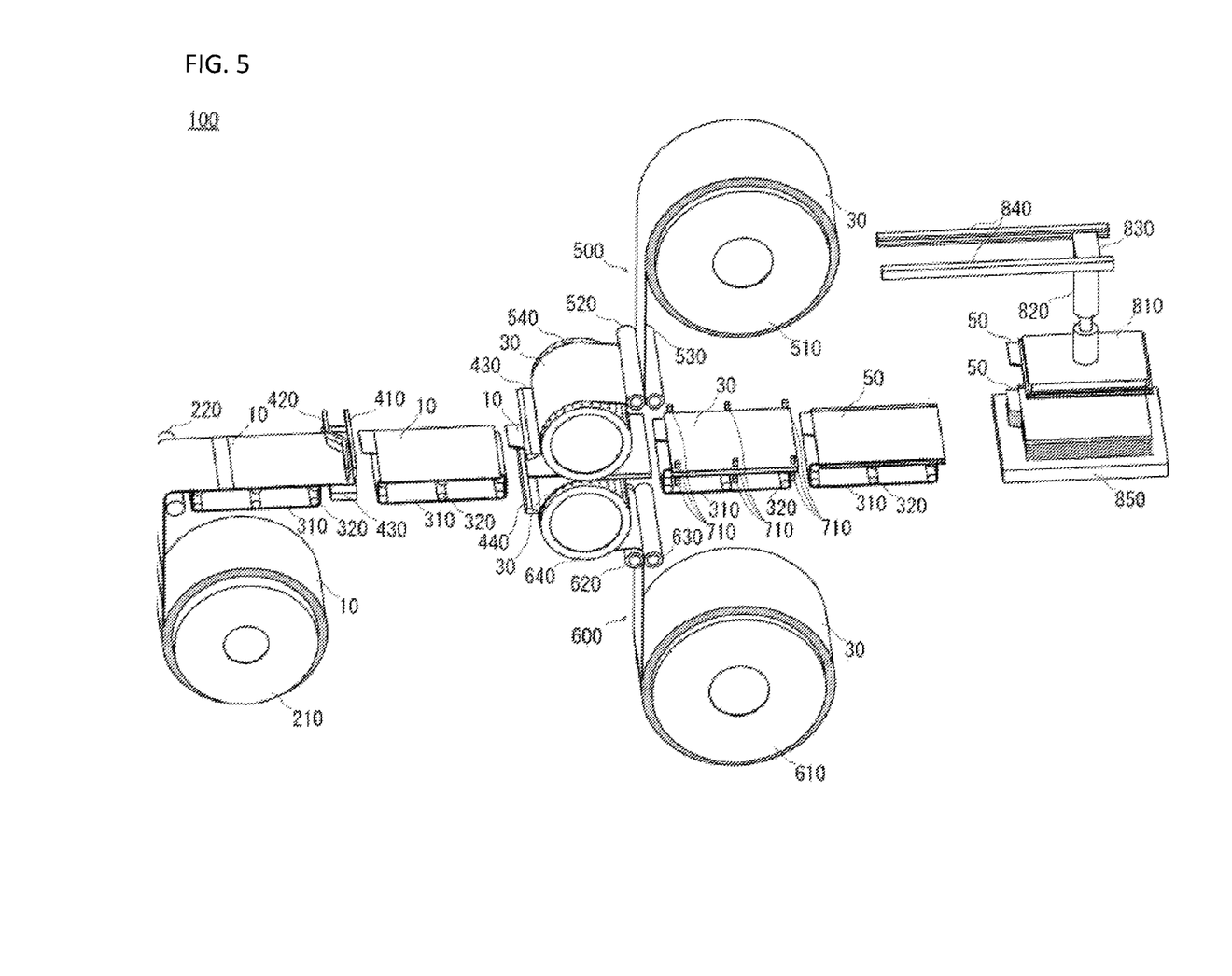
FIG. 5 is a perspective view showing a separator welding apparatus provided with a separator conveying apparatus pertaining to the present embodiment for joining the separator of the electrical device.
Figure 6:
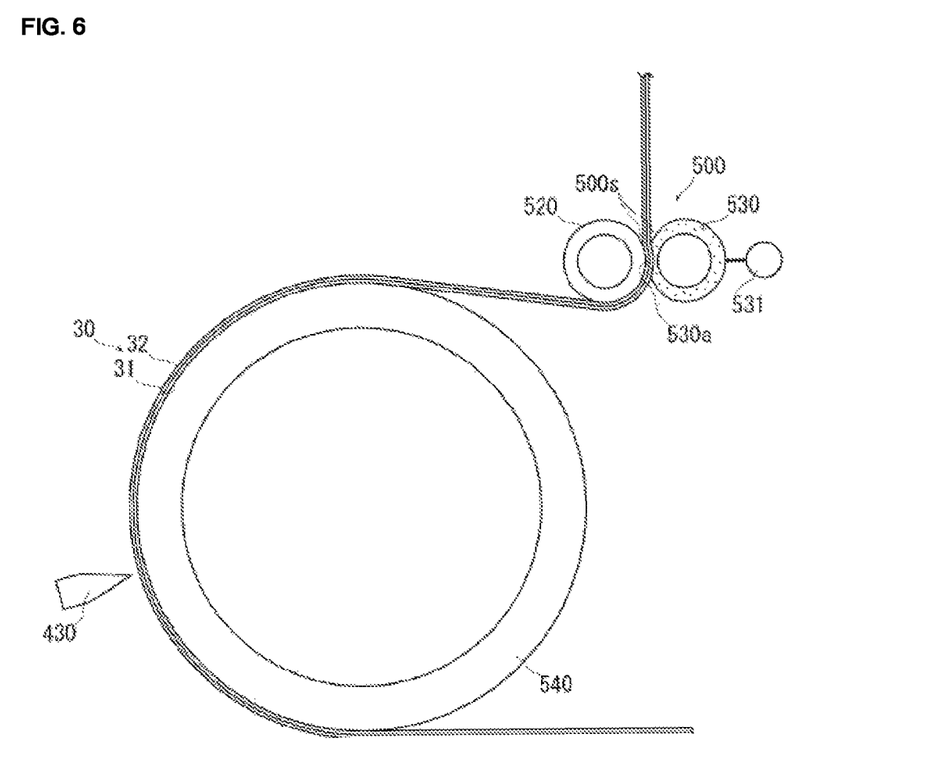
FIG. 6 is a side view showing the vicinity of the separator conveying apparatus pertaining to the present embodiment.
Figure 7:
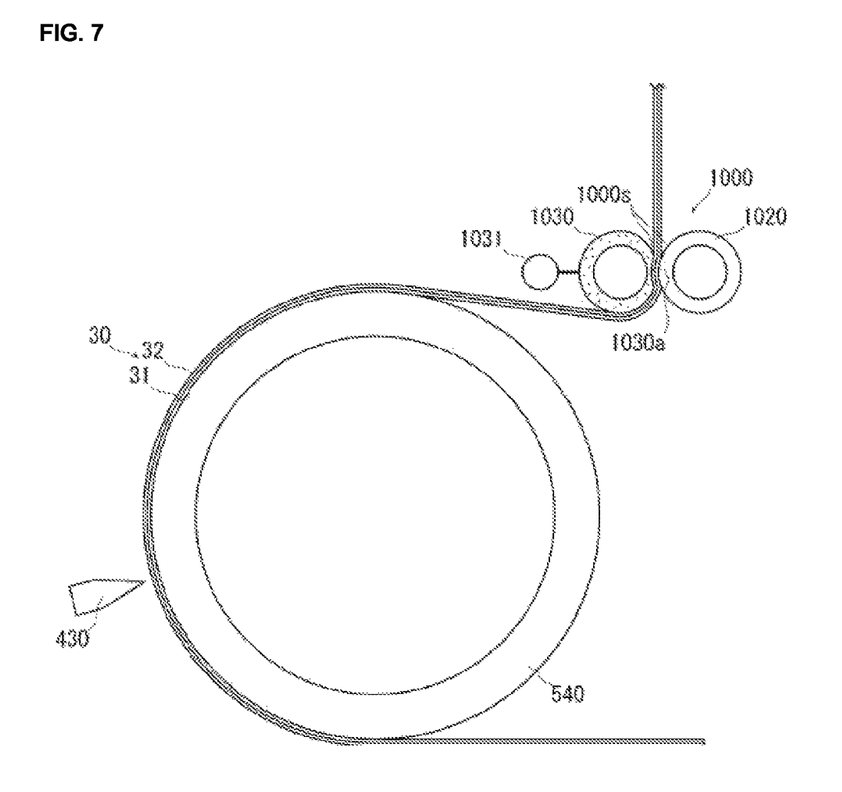
FIG. 7 is a side view showing the vicinity of a separator conveying apparatus pertaining to Comparative Example.

Now, description is given of a conveying method for conveying a separator 30 of the electrical device 1, a separator conveying apparatus 500, 600, and a separator welding apparatus 100 with the separator conveying apparatus 500, 600 adopted for joining the separators 30 together, with reference to FIGS. 5 to 7.

FIG. 5 is a perspective view showing a separator welding apparatus 100 provided with separator conveying apparatus 500, 600 for joining the separators 30 together. FIG. 6 is a side view showing the vicinity of the separator conveying apparatus 500, and FIG. 7 is a side view of the separator conveying apparatus pertaining to Comparative Example.

Here, it is equally acceptable to join the separators 30 together while conveying by pressurizing the separators 30 together by a heating press member 710 while heating, and to insert thereafter a positive electrode between a pair of the separators 30. However, in view of productivity and quality, description is given with respect to such a configuration in which the positive electrode sandwiched by the separators 30 are joined together by heating press member 710 under heat and pressure while being conveyed.

As shown in FIG. 5, in the separator joining or welding apparatus 100, the positive electrode 10 is held by being wound into a roll around a positive electrode winding roller 210. The positive electrode winding roller 210 is formed in a cylindrical shape and rotates in a clockwise direction following the rotation of the suction conveyor 310. The positive electrode 10 is carried out from the positive electrode winding roller 210 conveyed in the direction of 640 toward a vacuum suction conveyance drum 540 described below through a conveyance roller 220.

The suction conveyer 310 consists of an endless belt and provided with a plurality of suction holes on the surface. On the inner circumferential surface of the suction conveyor 310, a plurality of rotating rollers 320 is arranged. One of a plurality of the rotating rollers 320 is intended for a driving roller, and the others are driven rollers. The suction conveyors 310 caused to be rotated in a clockwise direction by the plurality of rotating rollers 320 are provided in two sets respectively on the conveyance downstream side and the conveyance upstream side of the positive electrode with respect to the vacuum suction conveyance drums 540, 640.

The cutting members 410, 420 for cutting out the positive electrode 10 are disposed between two sets of suction conveyors 310 disposed upstream in the conveyance direction of the positive electrode 10 with respect to the vacuum suction conveyance drum 540, 640. The cutting member 410 is provided at the tip with a sharp and straight cutting blade and cuts one end of the positive electrode 10 that is continuous. The cutting member 420 is provided with a sharp and bent cutting blade at the tip, and cuts the other end of the positive electrode 10 immediately after being cut at that one end. The shape of the bent cutting blade of the cutting member 420 corresponds to the shape of the positive electrode terminal 11a.

One separator 30 out of the pair of separators 30 is held in a roll and wound around the separator winding roller 510. A melt or fused material 31 of the one separator 30 is in contact with a side of axis of the separator winding roller 510. The separator winding roller 510 is formed in a cylindrical shape and allowed to rotate in counterclockwise direction following the rotation of the vacuum suction conveyance drum 540 representing the conveying apparatus. The one separator 30 is conveyed with a constant tension posed and sandwiched between the pressure roller 520 and the nip roller 530, and is further caused to rotate in a counterclockwise in a state of being vacuum sucked around the vacuum suction conveyance drum 540. The vacuum suction conveyance drum 540 is formed in a cylindrical shape with a plurality of suction ports. The one separator 30 is cut with a constant width by the cutting member 430 which is disposed in the vicinity of the vacuum suction conveying drum 540 and has a sharp cutting blade at the tip.

As detailed in FIG. 6, the separator conveying apparatus 500 includes a pressure roller 520 and a nip roller 530. The nip roller 530, formed in a rotatable cylindrical shape or columnar shape, corresponds to a drive member, and is made, at its nip portion 530a in contact with the melt material 31 of the separator 30 of rubber material such as urethane and the like. The nip roller 530 is allowed to rotate by a drive motor 531 via a shifting gear and the like. The pressure roller 520 corresponds to a pressurizing member, and is formed in metal at a portion in contact with the heat-resistant material 32 of the separator 30. The pressure roller 520 is further formed in a shape of rotatable cylinder or column. The separators 30 will be sandwiched by a gap 500a created between the nip roller 530 and the pressure roller 520.

The nip rollers 530, 630 is allowed to abut on or contact the portion of the melt material 31 representing a base or substrate, not a portion of heat-resistant material 32 which is likely to be peeled or shaved. Therefore, the separator 30 formed by laminating the heat-resistant material 32 on the melt material 31 maybe conveyed at a constant feed rate or size. Since the nip rollers 530, 630 which contact the separator for conveyance thereof are in contact with the portion of the melt material 31, the heat-resistant material will be free from an excessive stress to be applied. Thus, the heat-resistant material 32 of the separator 30 may be prevented from being peeled off or separated from the melt material 31 or from receiving a contact wound or touching mark.

The other separator 30 of the pair separators 30 is held wound in a roll around the separator winding roller 610. A melt material 31 of the other separator 30 is in contact with a side of axis of the separator winding roller 610. The separator winding roller 610 is formed in a cylindrical shape and allowed to rotate in clockwise direction following the rotation of the vacuum suction conveyance drum 640 representing the conveying apparatus. The other separator 30 is conveyed with a constant tension posed and sandwiched between the pressure roller 620 and the nip roller 630, and is further caused to rotate in a clockwise in a state of being vacuum sucked around the vacuum suction conveyance drum 640. The vacuum suction conveyer drum 640 is formed in a cylindrical shape with a plurality of suction ports. The other separator 30 is cut with a constant width by the cutting member 440 which is disposed in the vicinity of the vacuum suction conveying drum 640 and has a sharp cutting blade at the tip.

The separator conveying apparatus 600 has a structure similar to that of the separator conveying apparatus 500. The separator conveying apparatus 600 includes a pressure roller 520 and a nip roller 630. The nip roller 630, formed in a rotatable cylindrical shape or columnar shape, corresponds to a drive member, and is made, at its nip portion in contact with the melt material 31 of the separator 30 of rubber material such as urethane and the like. The nip roller 630 is allowed to rotate by a drive motor (not shown) via a shifting gear and the like. The pressure roller 620 corresponds to a pressurizing member, and is formed in metal at a portion in contact with the heat-resistant material 32 of the separator 30. The pressure roller 520 is further formed in a shape of rotatable cylinder or column. The separators 30 will be sandwiched by a gap 500a created between the nip roller 530 and the pressure roller 520.

The one separator 30, the positive electrode 10, and the other separator 30 are conveyed in a laminated state such that the pair of the separators 30 sandwich the positive electrode 10 in a gap created between the vacuum suction conveyance drums 540, 640.

The heating press member 710 is respectively disposed above and below both ends of the pair of separators 30 in the longitudinal direction thereof and is configured to sandwich the pair of the separators 30 and subsequently move up or down to separate from each other. The pair of separators 30 sandwiching the positive electrode 10 are joined or welded to form a pouched electrode 50. The pair of the separators 30 is disposed such that the respective heat-resistant member 32 comes to face each other. The heating press member 710 is made of stainless steel or copper, for example, and formed in a cuboid shape. The heating press member 710 is driven to move up and down by a drive unit not shown. The heating press member 710 will be heated by a heat wire or a heating bulb.

A plurality of the heating press members 710 sandwich both ends of the pair of the separators 30 in the longitudinal direction thereof from the vertical direction to join the pair of the separators 30. At this time, the pair of the separators 30 is held heated and pressurized by the heating press member 710. The heating press member 710 is adjusted to a temperature at which the melt material 31 of the pair of the separators 30 is caused to melt while preventing the heat-resistant material 32 from being melt. Thus, due to the melt material 31 subject to melting by the heating press member 710 being pressurized, the pair of the separators 30 is joined together. Subsequently, the plurality of the heating press members 710 will be separated from the joined pair of the separators 30. In the separator welding method described above, the pair of separators 30 sandwiching the positive electrode 10 are subject to heat and pressure by the heating press member 710 to weld the paired separators 30. The welding process of a pair of separators 30 corresponds to a process for forming so-called pouched electrode 50 which is excellent in terms of productivity and quality.

A bagged or pouched electrode suction pad 810 places a completed pouched electrode 50 temporarily on a mounting table 850. The pouched electrode suction pad 810 is plate-shaped and provided with a plurality of suction ports in the surface which is in contact with the pouched electrode 50. The pouched electrode suction pad 810 is coupled to an end of a telescopic part 820, which is telescopically extendable by power of the air compressor or the like, for example (not shown). The other end of the telescopic part 820 is coupled to a plate-shaped support member 830. The support member 830 reciprocates along a pair of rails by a rotation motor (not shown), for example. As described, the pouched electrode suction pad 810 moves by the telescopic part 820, support member 830, and the pair of rails 840, the pouched electrode 50 which has been conveyed by the suction conveyor 310 to place on the mounting table 850.

According to the conveying method for conveying a separator 30 of the electrical device 1 described above, and the separator conveying apparatus 500, 600 embodying the separator conveying method, the following effects can be obtained.

The separator conveying apparatus 500, 600 for an electrical device 1 is intended to convey a laminated body formed by alternately stacking or laminating a positive electrode 10, a negative electrode 20 with a polarity different from the positive electrode 10 with a separator 30 interposed there between. Such a separator 30 is used that includes a melt material 31 representing a base or substrate and a heat-resistant material 32 laminated on one surface of the melt material 31 and having a melting point higher than the melt material 31. The apparatus further includes nip rollers 530, 640 for contacting the separator 30 to convey the separator 30, and press rollers 520, 620 for urging the nip rollers 530, 630 via the separator 30 and driven by the nip rollers 530, 630. Here, the nip rollers 530, 630 contact the portion of the melt material 31 of the separator 30.

With this structure, the nip rollers 530, 630 are not placed in contact with the portion of the heat-resistant material 32 which is likely to be peeled off or shaved, but allowed to contact with the melt material 31 constituting a substrate. Therefore, it is possible to convey the separator 30 formed by laminating the heat-resistant material 32 on the melt material 31 at a constant feed size.

Thus, a positional deviation does not occur in the separator 30 formed of alternately laminated electrode and separator assembly. That is, the electrical device 1 alternately laminated with separators 30 and electrode is prevented from deterioration or degradation of electrical characteristics due to the displacement of the separator 30.

Further, with this structure, since the melt material 31 of the separator 30 contacts the side of the nip rollers 530, 560 which serve to impart a conveying force of the separator 30 by contacting the separator 30, no excessive stress is applied to the heat-resistant material 32. Therefore, the heat-resistant material 32 of the separator 30 is prevented from being peeled off from the molten material 31 or producing contact wound.

Furthermore, with this structure, it is possible to suppress the amount of shaved and scattered heat-resistant material 32 of the separator 30. Thus, there is no need to provide a cleaning mechanism for cleaning the heat-resistant material 32 that is shaved and scattered. Even supposing to provide such a cleaning mechanism, it is possible to significantly simplify the structure.

Furthermore, with this structure, when configuring the separator conveying apparatus 500 in this embodiment by improving the conventional apparatus, it is sufficient for the nip rollers 530, 630 to be changed in their positions with the press rollers 520, 620. Thus, modification of the apparatus is easy and can be performed in a short time. Therefore, the accompanying modification of the apparatus may be performed cost effectively.

Moreover, in the present embodiment, the nip rollers 530 and 630 are formed of an elastic material at the portion in contact with the melt material 31 of the separator 30. The pressure rollers 520, 620 are formed in metal at the portion that comes into contact with the heat-resistant material 32 of the separator 30.

With this structure, the nip rollers 530, 630 are made of an elastic material with good conformability to the shape of the separator 30, when urged by the pressure rollers 530, 620, a nip portion 530 with a partly recess may be formed. Thus, by way of the nip portion 530a and the like, a preset friction force may be generated against the melt material 31 of the separator 30 so that the separator 30 may be conveyed with its feeding rate maintained at high accuracy.

Further, with this structure, the pressure rollers 520, 620 have a metal portion in contact with the heat-resistant material 32 of the separator 30. Thus, the surface of the rollers may be polished to reduce 620 and the pressure roller 520 includes a heat-resistant material 32 of the separator 30, reducing the coefficient of friction. The metal formed with reduced coefficient of friction also makes adherence of the heat-resistant material difficult. Even when the heat-resistant material 32 may be attached to the pressure rollers 520, 620, these rollers are driven rollers following the nip rollers 530, 630. Thus, the incident would not affect the accuracy of the feed size of the separator 30.

Moreover, in the present embodiment, the heat-resistant material 32 of the separator to be conveyed may be configured to include a powder applied and dried to the melt material 31.

With this configuration, even when the heat-resistant material 32 in contact with the pressure roller 520 is applied with a easily scraped powder and is likely produce irregularities on the surface due to scraping to cause a great fluctuations in friction force, the nip rollers 530, 630 is unaffected in the feed size due to contact with the melt material.

Further, in the present embodiment, it is possible to form the powder of ceramic.

With this configuration, even in the case in which the heat-resistant material which comes into contact with the pressure roller 520 is made of powder extremely easily scraped such as a ceramic molding of inorganic compound at a high temperature and the friction force undergoes extremely high fluctuations due to the generated irregularities on the surface, the nip rollers 530, 630 which control the feeding size of the separator are unlikely to be influenced since these are in contact with the melt material.

In a separator conveying apparatus shown in FIG. 7 as Comparative Example, the nip roller 1030 corresponding to a drive member contacts the heat-resistant material 32 of the separator, while the pressure roller 1020 corresponding to a pressurizing member is in contact with the molten metal 31 of the separator 30. By a driving motor 1031 via a shifting gear and the like, the nip roller is caused to rotate. The nip roller 1030 is urged or pressed by the pressure roller 1020 and forms a nip portion 1030a with a part recessed. A separator 30 is sandwiched in a gap 1000s between the nip roller 1030 and the pressure roller 1020. With this structure, with respect to the nip roller 1030 which controls a feeding size of the separator 30, the heat-resistant material 32 is made contact with, which is easier to be shaved or peeled off compared to the melt material 31. Thus, the friction force between the nip roller 1030 and the separator 30 becomes unstable so that it is impossible to convey the separate at high accuracy of feed rate.

In contrast, in the present embodiment, compared to Comparative Example, the nip rollers 530, 630 are placed in contact with the melt material 31 constituting a substrate, not with the heat-resistant material portion which is susceptible of easy shave and separation. Therefore, in the present embodiment, it is possible to convey the separator 30 composed of laminated body of the melt material 31 and the heat-resistant material 32 at a constant or stable feed rate.

In addition, the present invention is capable of various modifications on the basis of the configuration described in the claims which is held to be within the scope of the present invention.

What is claimed is:

1. A method of conveying separator material used to form a separator of an electrical device, the method comprising:
   laminating a melt material and a heat-resistant material together to form the separator material, the heat-resistant material having a melting point higher than the melt material;
   winding a first roll of the separator material around a first winding roller with the melt material in contact with the first winding roller;
   conveying the first roll of the separator material using a first drive member and a first pressure member, the first drive member driven by a first drive motor and in contact with the melt material of the first roll of the separator material, and the first pressure member driven by the first drive member via the separator material, wherein the first pressure member is formed of metal and contacts the heat-resistant material of the first roll of the separator material, wherein the first roll is conveyed at a constant feed rate, wherein the first drive member is formed of an elastic material at a portion in contact with the melt material, and wherein the first drive member includes a shape that conforms to a shape of the separator.

2. The method of claim 1, wherein the heat-resistant material includes a powder applied to the melt material and subsequently dried.

3. The method of claim 2, wherein the powder is formed of ceramic.

4. The method of claim 1, further comprising:
   winding a second roll of the separator material around a second winding roller with the melt material in contact with the second winding roller, wherein the second winding roller is disposed parallel to the first winding roller;
   conveying the second roll of the separator material using a second drive member and a second pressure member, the second drive member driven by a second drive motor and in contact with the melt material of the second roll of the separator material, and the second pressure member driven by the second drive member via the separator material, wherein the second pressure member is formed of metal and contacts the heat-resistant material of the second roll of the separator material, wherein the second roll is conveyed at the constant feed rate, wherein an electrode material is disposed between the first roll of the separator material and the second roll of the separator material and wherein the heat-resistant material of the first roll of the separator material contacts the heat-resistant material of the second roll of the separator material.

5. The method of claim 4, wherein the second drive member is formed of an elastic material at a portion in contact with the melt material of the second roll of the separator material.

6. The method of claim 4, wherein the heat-resistant material includes a powder applied to the melt material and subsequently dried.

7. The method of claim 6, wherein the powder is formed of ceramic.

8. The method of claim 4, further comprising:
   conveying with a suction conveyor an electrode material wound around an electrode winding roller, the electrode material conveyed between the first roll of separator material and the second roll of separator material such that the heat-resistant material of each of the first roll and second roll contact opposite surfaces of the electrode material.

9. The method of claim 8, further comprising:
hot pressing the electrode material between the first roll and the second roll of separator material to form a pouch with the heat-resistant material of each of the first roll and second roll facing each other.

* * * * *